United States Patent
Karim et al.

[11] Patent Number: 6,136,384
[45] Date of Patent: Oct. 24, 2000

[54] EPOXY/THERMOPLASTIC PHOTOCURABLE ADHESIVE COMPOSITION

[75] Inventors: Naimul Karim, Maplewood; Clayton A. George, Afton; Christopher M. Meyer, Woodbury, all of Minn.

[73] Assignee: 3M Innovative Properties Company, St. Paul, Minn.

[21] Appl. No.: 09/515,433

[22] Filed: Feb. 29, 2000

Related U.S. Application Data

[62] Division of application No. 09/070,971, May 1, 1998, Pat. No. 6,057,382.

[51] Int. Cl.[7] .................. C08F 2/46; C08F 8/00; C08F 2/50; C08J 7/04

[52] U.S. Cl. .................. 427/516; 427/487; 427/508; 522/100; 522/122; 522/102; 522/113; 522/134; 522/143

[58] Field of Search .................. 522/122, 100, 522/102, 113, 134, 143; 524/379, 388, 430; 525/107; 523/457, 420, 143; 427/487, 508, 516

[56] References Cited

U.S. PATENT DOCUMENTS

| | | | |
|---|---|---|---|
| 2,071,549 | 2/1937 | Malhman | 51/287 |
| 2,128,905 | 9/1938 | Benner et al. | 51/287 |
| 2,128,907 | 9/1938 | Benner et al. | 51/295 |
| 2,958,593 | 11/1960 | Hoover et al. | 260/29.2 |
| 3,018,262 | 1/1962 | Schroeder | 260/18 |
| 3,117,099 | 1/1964 | Proops et al. | 260/837 |
| 3,464,948 | 9/1969 | Russel | 521/135 |
| 3,641,195 | 2/1972 | Ball et al. | 260/837 |
| 4,009,224 | 2/1977 | Warnken | 525/119 |
| 4,026,705 | 5/1977 | Crivello et al. | 430/280.1 |
| 4,028,393 | 6/1977 | Rotloff et al. | 430/280.1 |
| 4,058,401 | 11/1977 | Crivello | 430/280 |
| 4,256,828 | 3/1981 | Smith | 430/280 |
| 4,312,902 | 1/1982 | Murase et al. | 427/386 |
| 4,427,481 | 1/1984 | Smith et al. | 156/306.6 |
| 4,517,340 | 5/1985 | Read et al. | 525/143 |
| 4,560,579 | 12/1985 | Siadat et al. | 427/45.1 |
| 4,612,209 | 9/1986 | Forgo et al. | 427/54.1 |
| 4,652,275 | 3/1987 | Bloecher et al. | 51/389 |
| 4,684,678 | 8/1987 | Schultz et al. | 523/466 |
| 4,693,775 | 9/1987 | Harrison et al. | 156/272 |
| 4,708,993 | 11/1987 | Hoffman et al. | 525/530 |
| 4,751,138 | 6/1988 | Tumey et al. | 428/323 |
| 4,789,712 | 12/1988 | Hoffman et al. | 525/528 |
| 4,799,939 | 1/1989 | Bloecher et al. | 51/293 |
| 4,850,871 | 7/1989 | Bryan | 51/293 |
| 4,903,440 | 2/1990 | Larson et al. | 525/438 |
| 4,920,182 | 4/1990 | Manser et al. | 428/40 |
| 4,933,219 | 6/1990 | Sakumoto et al. | 428/40 |
| 4,991,362 | 2/1991 | Heyer et al. | 51/400 |
| 4,997,717 | 3/1991 | Rembold et al. | 478/413 |
| 5,059,701 | 10/1991 | Keipert | 556/13 |
| 5,071,914 | 12/1991 | Zimmel et al. | 525/113 |
| 5,089,536 | 2/1992 | Palazzoto et al. | 522/16 |
| 5,095,046 | 3/1992 | Tse | 523/206 |
| 5,191,101 | 3/1993 | Palazzotto et al. | 556/47 |
| 5,215,860 | 6/1993 | McCormick et al. | 430/270 |
| 5,236,472 | 8/1993 | Kirk et al. | 51/298 |
| 5,242,980 | 9/1993 | Tse | 525/114 |
| 5,252,694 | 10/1993 | Willett et al. | 525/404 |
| 5,294,517 | 3/1994 | McCormick et al. | 430/270 |
| 5,387,492 | 2/1995 | McCormick et al. | 430/270 |
| 5,407,978 | 4/1995 | Bymark et al. | 523/457 |
| 5,436,063 | 7/1995 | Follette et al. | 428/323 |
| 5,507,850 | 4/1996 | Helmin | 51/298 |
| 5,523,152 | 6/1996 | Thurber et al. | 428/323 |
| 5,558,911 | 9/1996 | Blum | 427/517 |
| 5,703,198 | 12/1997 | Twigt et al. | 528/303 |
| 5,704,952 | 1/1998 | Law et al. | 51/306 |
| 5,709,948 | 1/1998 | Perez et al. | 428/413 |

FOREIGN PATENT DOCUMENTS

| | | |
|---|---|---|
| 0 209 859 | 1/1987 | European Pat. Off. . |
| 0 281 354 | 9/1988 | European Pat. Off. . |
| 0 289 632 | 11/1990 | European Pat. Off. . |
| 0 396 150 | 11/1990 | European Pat. Off. . |
| 0 447 115 | 9/1991 | European Pat. Off. . |
| 0 486 308 | 5/1992 | European Pat. Off. . |
| 0 500 009 | 8/1992 | European Pat. Off. . |
| 0 560 018 | 9/1993 | European Pat. Off. . |
| 0 620 259 | 11/1994 | European Pat. Off. . |
| 0 654 323 | 5/1995 | European Pat. Off. . |
| 0 721 975 | 7/1996 | European Pat. Off. . |
| 0 747 170 | 12/1996 | European Pat. Off. . |
| 0 819 747 | 1/1998 | European Pat. Off. . |
| 3243383 | 5/1984 | Germany . |
| 39 38 376 | 5/1991 | Germany . |
| 19541923 | 5/1997 | Germany . |
| 53-042280 | 4/1978 | Japan . |
| 56-122823 | 9/1981 | Japan . |
| 57-25379 | 1/1982 | Japan . |
| 60-137980 | 7/1985 | Japan . |
| 60-228527 | 11/1985 | Japan . |
| 63-144964 | 6/1988 | Japan . |
| 1098660 | 4/1989 | Japan . |
| 52-75842 | 11/1993 | Japan . |
| 8-85780 | 4/1996 | Japan . |
| 9-176599 | 7/1997 | Japan . |
| 9-176600 | 7/1997 | Japan . |
| 9-183957 | 7/1997 | Japan . |
| 9-235390 | 9/1997 | Japan . |
| 1183519 | 11/1985 | U.S.S.R. . |
| 2 091 736 | 8/1982 | United Kingdom . |
| 2 138 008 | 11/1984 | United Kingdom . |
| 92/20754 | 11/1992 | WIPO . |
| 93/11200 | 6/1993 | WIPO . |
| 93/23487 | 11/1993 | WIPO . |
| 97/12919 | 4/1997 | WIPO . |
| 97/25185 | 7/1997 | WIPO . |
| 97/42004 | 11/1997 | WIPO . |
| 98/12021 | 3/1998 | WIPO . |

OTHER PUBLICATIONS

J. Crivello, Advances in Polymer Science, 62, 3 (1984).
Cationic Polymerization—Iodonium and Sulfonium Salt Photoinitiators, Mar. 1984.

*Primary Examiner*—James J. Seidleck
*Assistant Examiner*—Sanza L. McClendon
*Attorney, Agent, or Firm*—Scott A. Bardell

[57] ABSTRACT

A curable composition comprising a) a curable epoxy resin, a thermoplastic ethylene-vinyl acetate copolymer resin, and an effective amount of a photocatalyst for the curable epoxy resin, wherein the composition is free from hydrocarbon polyolefins and wherein the sum of a) and b) is 100 weight percent.

3 Claims, No Drawings

EPOXY/THERMOPLASTIC PHOTOCURABLE ADHESIVE COMPOSITION

CROSS REFERENCE TO RELATED APPLICATION

This application is a divisional of U.S. patent application No. 09/070,971 now, U.S. Pat No. 6,057,382 filed May 1, 1998, which is incorporated herein by reference.

FIELD OF THE INVENTION

This invention relates to adhesive compositions. More specifically, this invention relates to adhesive compositions comprising thermoplastic resins and epoxy resins. The invention also provides a method of preparing adhesive compositions and adhesive articles and uses thereof.

BACKGROUND OF THE INVENTION

Adhesive composition blends of curable epoxy resins with various thermoplastic polymers are known. For example, adhesive compositions comprising epoxy and polyester thermoplastic resins have been used as hot melt adhesives and in the manufacture of structural bonding and sealing tapes.

However, adhesive compositions consisting of epoxy resins and thermoplastic polyesters have several deficiencies. For example, they can be prone to excessive flow prior to or during cure, unless flow control additives are incorporated. This excessive flow may result in a messy adhesive bond line that must be smoothed out in a subsequent step in cases where appearance is important (for example, exterior automotive applications such as trim adhesion, body panel and door skin replacement). Additionally, excessive flow can form gaps in the bond line which may lead to bond failure due to moisture penetration or corrosion. Also, those epoxy-polyester adhesive compositions that have been formulated not to undergo excessive flow typically lack sufficient tack to be used in the form of a thermosettable pressure-sensitive tape without incorporation of additional ingredients or a separate adhesive layer. Further, in order to obtain tack and good adhesion to painted metal substrates it is often necessary to increase the epoxy content of the adhesive composition above that level which otherwise achieves optimal properties.

Thermally curable compositions of epoxy resins having ethylene-vinyl acetate (also called "EVA" herein) copolymer particles dispersed therein have also been disclosed as toughened epoxy resins containing a dispersed phase of EVA polymerized in situ.

Epoxy material containing compositions having thermal curatives or hardeners such as those described above are difficult to melt process into articles (for example, tapes, films, or rods) without causing premature curing of the composition. Use of high temperature curatives that do not cause curing during such processing steps requires a high cure temperature during formation of the adhesive bond, which can cause excessive flow of the adhesive during cure thereby resulting in an aesthetically unpleasant or structurally defective bond or thermal damage on the case of thermally sensitive substrates.

SUMMARY OF THE INVENTION

The invention provides curable compositions formed by mixing components comprising:
a) from about 20 to about 80 weight percent of a curable epoxy resin;
b) from about 20 to about 80 weight percent of a thermoplastic ethylene-vinyl acetate copolymer resin; and
c) an effective amount of a photocatalyst for the curable epoxy resin such that the total of components a) and b) is 100 percent and, wherein the compositions are free from hydrocarbon polyolefins and are homogeneous mixtures.

The compositions of the invention, exclusive of additives, form homogeneous and single phased molten mixtures and resulting uncured solids, for example, unsupported films.

The compositions of the invention may also contain up to 50 percent by volume, preferably up to 30 percent by volume, of the total composition of various additives such as fillers, tackifiers, and the like.

In another aspect, the invention describes a method comprising the steps of:
a) providing a homogeneous molten mixture comprising a curable epoxy resin, a thermoplastic ethylene-vinyl acetate copolymer resin; and an effective amount of a photocatalyst for the curable epoxy resin, wherein the composition is free from hydrocarbon polyolefins;
b) applying the mixture to a substrate or processing into an unsupported film; and
c) at any subsequent time, activating the photocatalyst to cure the epoxy containing material.

If necessary, the compositions may be heated to accelerate cure or to ensure complete cure.

The present invention overcomes the deficiencies of polyester-epoxy and thermally cured EVA-epoxy adhesives by providing compositions having significant tack in the uncured state, good cured adhesion to surface treated (for example, E-coated) metals, low controlled flow during curing and desirable physical properties of the cured resin (structural adhesive and cohesive strength, and paintability). The improved tack of the adhesive in the uncured state keeps the adhesive in place during assembly and minimizes the need for the use of clamps during the cure step. Further, the present invention provides bonding tapes characterized by good tack, limited mass flow and structural bond strength (that is, >1000 psi (6.9 mega Pascals (Mpa)) overlap shear strength) and can be processed on a 100 percent solids basis without the use of solvents typically used in the art.

The adhesive compositions of the invention are free from, that is, do not contain, hydrocarbon polyolefin resins. "Hydrocarbon polyolefin resin" refers to a fully prepolymerized uncrosslinked polymeric hydrocarbon bearing essentially no organic functional groups, prepared from homopolymerization and/or copolymerization of an olefinic monomer(s). Such resins are typically incompatible with epoxy resins and will cause phase separation of compositions containing an appreciable amount of epoxy resin. Examples of such resins include polyethylene, polypropylene, and the like, and poly(ethylene-co-propylene), poly(propylene-co-1-butene), and the like.

A "tape" is defined as an uncured adhesive film attached to either a release liner or a backing that can be formed into a roll or cut into pieces and having a length greater than its width.

An "unsupported film" is defined as an uncured adhesive film having adhesive characteristics that may be tacky or not tacky at ambient temperature.

A "curable" or "uncured" composition is a composition that remains thermoplastic and melt processable and substantially uncrosslinked until subjected to either heat, light, or a combination of both at which time the composition polymerizes and/or crosslinks to form a thermoset material.

A "protected film" is an uncured adhesive film having a release liner or backing attached that can be formed into a roll or cut into pieces and having a length that is substantially the same as its width.

DETAILED DESCRIPTION

The adhesive compositions of the invention comprise from about 20 to about 80, preferably 30 to 70, more preferably 40 to 60 weight percent of an epoxy containing material, from about 20 to about 80, preferably from about 30 to about 70, more preferably from about 40 to about 60, weight percent ethylene-vinyl acetate copolymer, and an effective amount of a photocatalyst for the curable epoxy containing material, the weight percent being based on the total weight of epoxy resin and ethylene-vinyl acetate copolymer, and the compositions are free of hydrocarbon polyolefin resins.

Epoxy resins useful in the adhesive compositions of the invention are any organic compounds having at least one oxirane ring, that is,

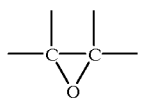

polymerizable by a ring opening reaction. Such materials, broadly called epoxides, include both monomeric and polymeric epoxides and can be aliphatic, alicyclic, heterocyclic, cycloaliphatic, or aromatic and can be combinations thereof. They can be liquid or solid or blends thereof, blends being useful in providing tacky adhesive films. These materials generally have, on the average, at least two epoxy groups per molecule and are also called "polyepoxides." The polymeric epoxides include linear polymers having terminal epoxy groups (for example, a diglycidyl ether of a polyoxyalkylene glycol), polymers having skeletal oxirane units (for example, polybutadiene polyepoxide), and polymers having pendent epoxy groups (for example, a glycidyl methacrylate polymer or copolymer). The molecular weight of the epoxy resin may vary from about 74 to about 100,000 or more. Mixtures of various epoxy resins can also be used in the hot melt compositions of the invention. The "average" number of epoxy groups per molecule is defined as the number of epoxy groups in the epoxy resin divided by the total number of epoxy molecules present.

Useful epoxy resins include those which contain cyclohexene oxide groups such as the epoxycyclohexane carboxylates, typified by 3,4-epoxycyclohexylmethyl-3,4-epoxycyclohexane carboxylate, 3,4-epoxy-2-methylcyclohexylmethyl-3,4-epoxy-2-methylcyclohexane carboxylate, and bis(3,4-epoxy-6-methylcyclohexylmethyl) adipate. For a more detailed list of useful epoxides of this nature, reference may be made to U.S. Pat. No. 3,117,099, incorporated herein by reference.

Further epoxy resins which are particularly useful in the practice of this invention include glycidyl ether monomers of the formula:

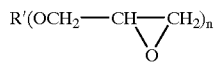

where R' is aliphatic, for example, alkyl, aromatic, for example, aryl, or combinations thereof, and n is an integer of 1 to 6. Examples are the glycidyl ethers of polyhydric phenols obtained by reacting a polyhydric phenol with an excess of chlorohydrin such as epichlorohydrin, for example, the diglycidyl ether of 2,2-bis-(4-hydroxyphenol) propane (Bisphenol A). Further examples of epoxides of this type which can be used in the practice of this invention are described in U.S. Pat. No. 3,018,262, incorporated herein by reference. Preferred epoxy resins include diglycidyl ethers of Bisphenol A and hydrogenated bisphenol A-epichlorohydrin based epoxy resins.

There is a host of commercially available epoxy resins which can be used in this invention. In particular, epoxides which are readily available include octadecylene oxide, epichlorohydrin, styrene oxide, vinylcyclohexene oxide, glycidol, glycidyl methacrylate, diglycidyl ether of Bisphenol A (for example, those available under the trade designations "EPON 828", "EPON 1004", and "EPON 1001F" from Shell Chemical Co., and "DER-332" and "DER-334", from Dow Chemical Co.), diglycidyl ether of Bisphenol F (for example, those under the trade designations "ARALDITE GY281" from Ciba-Geigy Corp., and "EPON 862" from Shell Chemical Co.), vinylcyclohexene dioxide (for example, having the trade designation "ERL-4206" from Union Carbide Corp.), 3,4-epoxycyclohexyl-methyl-3,4-epoxycyclohexene carboxylate (for example, having the trade designation "ERL-4221" from Union Carbide Corp.), 2-(3,4-epoxycyclohexyl-5,5-spiro-3,4-epoxy) cyclohexane-metadioxane (for example, having the trade designation "ERL-4234" from Union Carbide Corp.), bis(3,4-epoxycyclohexyl) adipate (for example, having the trade designation "ERL-4299" from Union Carbide Corp.), dipentene dioxide (for example, having the trade designation "ERL-4269" from Union Carbide Corp.), epoxidized polybutadiene (for example, having the trade designation "OXIRON 2001" from FMC Corp.), epoxy silanes, for example, beta-3,4-epoxycyclohexylethyltrimethoxy silane and gamma-glycidoxypropyltrimethoxy silane, commercially available from Union Carbide, flame retardant epoxy resins (for example, having the trade designation "DER-542", a brominated bisphenol type epoxy resin available from Dow Chemical Co.), 1,4-butanediol diglycidyl ether (for example, having the trade designation "ARALDITE RD-2" from Ciba-Geigy), hydrogenated bisphenol A-epichlorohydrin based epoxy resins (for example having the trade designation "EPONEX 1510" from Shell Chemical Co.), and polyglycidyl ether of phenol-formaldehyde novolak (for example, having the trade designation "DEN-431" and "DEN-438" from Dow Chemical Co.).

Catalysts

Catalysts of the present invention preferably are activated by photochemical means, such as by actinic radiation (radiation having a wavelength in the ultraviolet or visible portion of the electromagnetic spectrum). Useful photocatalysts are of two general types: onium salts and cationic organometallic salts, both described in U.S. Pat. No. 5,709,948, incorporated herein by reference.

Onium salt photoinitiators for cationic polymerizations include iodonium and sulfonium complex salts. Useful aromatic iodonium complex salts are of the general formula:

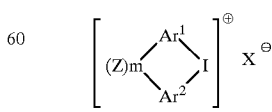

wherein

Ar$^1$ and Ar$^2$ can be the same or different and are aromatic groups having from 4 to about 20 carbon atoms, and are selected from the group consisting of phenyl, thienyl, furanyl, and pyrazolyl groups;

Z is selected from the group consisting of oxygen, sulfur, and a carbon-carbon bond,

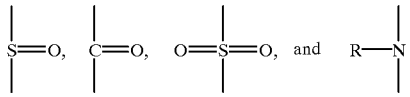

wherein R can be aryl (having from 6 to about 20 carbon atoms, such as phenyl) or acyl (having from 2 to about 20 carbon atoms, such as acetyl, or benzoyl), and

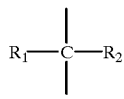

wherein $R_1$ and $R_2$ are selected from the group consisting of hydrogen, alkyl radicals having from 1 to about 4 carbon atoms, and alkenyl radicals having from 2 to about 4 carbon atoms;

m is zero or 1; and

X has the formula $DQ_n$, wherein D is a metal from Groups IB to VIII or a metalloid from Groups IIIA to VA of the Periodic Chart of the Elements (Chemical Abstracts version), Q is a halogen atom, and n is an integer having a value of from 1 to 6. Preferably, the metals are copper, zinc, titanium, vanadium, chromium, magnesium, manganese, iron, cobalt, or nickel and the metalloids preferably are boron, aluminum, antimony, tin, arsenic and phosphorous. Preferably, the halogen, Q, is chlorine or fluorine. Illustrative of suitable anions are $BF_4^-$, $PF_6^-$, $SbF_6^-$, $FeCl_4^-$, $SnCl_5^-$, $AsF_6^-$, $SbF_5OH^-$, $SbCl_6^-$, $SbF_5^{-2}$, $AlF_5^{-2}$, $GaCl_4^-$, $InF_4^-$, $TiF_6^{-2}$, $ZrF_6^-$, $CF_3SO_3^-$, and the like. Preferably, the anions are $BF_4^-$, $PF_6^-$, $SbF_6^-$, $AsF_6^-$, $SbF_5OH^-$, and $SbCl_6^-$. More preferably, the anions are $SbF_6^-$, $AsF_6^-$, and $SbF_5OH^-$.

The $Ar_1$ and $Ar_2$ aromatic groups may optionally comprise one or more fused benzo rings (for example, naphthyl, benzothienyl, dibenzothienyl, benzofuranyl, dibenzofuranyl, etc.). The aromatic groups may also be substituted, if desired, by one or more non-basic groups if they are essentially non-reactive with epoxide and hydroxyl functionalities.

Useful aromatic iodonium complex salts are described more fully in U.S. Pat. No. 4,256,828, which is incorporated herein by reference. The preferred aromatic iodonium complex salts are $(Ar)_2I\ PF_6$ and $(Ar)_2I\ SbF_6$.

The aromatic iodonium complex salts useful in the invention are photosensitive only in the ultraviolet region of the spectrum. However, they can be sensitized to the near ultraviolet and the visible range of the spectrum by sensitizers for known photolyzable organic halogen compounds. Illustrative sensitizers include colored aromatic polycyclic hydrocarbons, as described in U.S. Pat. No. 4,250,053, incorporated herein by reference. Suitable sensitizers should be chosen so as to not interfere appreciably with the cationic cure of the epoxy resin in the adhesive composition.

Aromatic sulfonium complex salt initiators suitable for use in the invention are of the general formula:

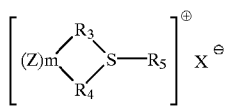

wherein $R_3$, $R_4$, and $R_5$ can be the same or different, provided that at least one of the groups is aromatic. These groups can be selected from the group consisting of aromatic moieties having from 4 to about 20 carbon atoms (for example, substituted and unsubstituted phenyl, thienyl, and furanyl) and alkyl radicals having from 1 to about 20 carbon atoms. The term "alkyl" includes substituted alkyl radicals (for example, substituents such as halogen, hydroxy, alkoxy, and aryl). Preferably, $R_3$, $R_4$, and $R_5$ are each aromatic; and Z, m, and X are all as defined above with regard to the iodonium complex salts.

If $R_3$, $R_4$, or $R_5$ is an aromatic group, it may optionally have one or more fused benzo rings (for example, naphthyl, benzothienyl, dibenzothienyl, benzofuranyl, dibenzofuranyl, etc.). The aromatic groups may also be substituted, if desired, by one or more non-basic groups if they are essentially non-reactive with epoxide and hydroxyl functionalities.

Triaryl-substituted salts such as triphenylsulfonium hexafluoroantimonate and p-(phenyl(thiophenyl) diphenylsulfonium hexafluoroantimonate are the preferred sulfonium salts. Useful sulfonium salts are described more fully in U.S. Pat. Nos. 5,256,828 and 4,173,476.

Aromatic sulfonium complex salts useful in the invention are typically photosensitive only in the ultraviolet region of the spectrum. However, they can be sensitized to the near ultraviolet and the visible range of the spectrum by a select group of sensitizers such as described in U.S. Pat. Nos. 4,256,828 and 4,250,053.

If a sensitizer is used in combination with iodonium or sulfonium salts as described above, it should be chosen so as to not interfere appreciably with the cationic cure of the epoxy resin in the adhesive composition.

Suitable photoactivatable organometallic complex salts useful in the invention include those described in U.S. Pat. Nos. 5,059,701; 5,191,101; and 5,252,694, each of which is incorporated herein by reference. Such salts of organometallic cations have the general formula:

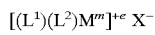

wherein $M^m$ represents a metal atom selected from elements of periodic groups IVB, VB, VIB, VIIB, and VIII, preferably Cr, Mo, W, Mn, Re, Fe, and Co;

$L^1$ represents none, one, or two ligands contributing π-electrons that can be the same or different ligand selected from the group consisting of substituted and unsubstituted alicyclic and cyclic unsaturated compounds and groups and substituted and unsubstituted carbocyclic aromatic and heterocyclic aromatic compounds, each capable of contributing two to twelve π-electrons to the valence shell of the metal atom M. Preferably, $L^1$ is selected from the group consisting of substituted and unsubstituted $\eta^3$-allyl, $\eta^5$-cyclopentadienyl, $\eta^7$-cycloheptatrienyl compounds, and $\eta^6$-aromatic compounds selected from the group consisting of $\eta^6$-benzene and substituted $\eta^6$-benzene compounds (for example, xylenes) and compounds having 2 to 4 fused rings, each capable of contributing 3 to 8 η-electrons to the valence shell of $M^m$;

$L^2$ represents none or 1 to 3 ligands contributing an even number of σ-electrons that can be the same or different ligand selected from the group consisting of carbon monoxide, nitrosonium, triphenyl phosphine, triphenyl stibine and derivatives of phosphorous, arsenic and antimony, with the proviso that the total electronic charge contributed to $M^m$ by $L^1$ and $L^2$ results in a net residual positive charge of e to the complex;

e is an integer having a value of 1 or 2, the residual charge of the complex cation; and X is a halogen-containing complex anion, as described above.

Examples of suitable salts of organometallic complex cations useful as photoactivatable catalysts in the present invention include:

($\eta^6$-benzene)($\eta^5$-cyclopentadienyl)$Fe^{+1}$ $SbF_6^-$
($\eta^6$-toluene)($\eta^5$-cyclopentadienyl)$Fe^{+1}$ $AsF_6^-$
($\eta^6$-xylene)($\eta^5$-cyclopentadienyl)$Fe^{+1}$ $SbF_6^-$
($\eta^6$-cumene)($\eta^5$-cyclopentadienyl)$Fe^{+1}$ $PF_6^-$
($\eta^6$-xylenes (mixed isomers))($\eta^5$-cyclopentadienyl)$Fe^{+1}$ $SbF_6^-$
($\eta^6$-xylenes (mixed isomers))($\eta^5$-cyclopentadienyl)$Fe^{+1}$ $PF_6^-$
($\eta^6$-o-xylene)($\eta^5$-cyclopentadienyl)$Fe^{+1}$ $CF_3SO_3^-$
($\eta^6$-m-xylene)($\eta^5$-cyclopentadienyl)$Fe^{+1}$ $BF_4^-$
($\eta^6$-mesitylene)($\eta^5$-cyclopentadienyl)$Fe^{+1}$ $SbF_6^-$
($\eta^6$-hexamethylbenzene)($\eta^5$-cyclopentadienyl)$Fe^{+1}$ $SbF_5OH^-$ and
($\eta^6$-fluorene)($\eta^5$-cyclopentadienyl)$Fe^{+1}$ $SbF_6^-$.

Preferred salts of organometallic complex cations useful in the invention include one or more of the following: ($\eta^6$-xylenes (mixed isomers))($\eta^5$-cyclopentadienyl)$Fe^{+1}$ $SbF_6^-$, ($\eta^6$-xylenes (mixed isomers))($\eta^5$-cyclopentadienyl)$Fe^{+1}$ $PF_6^-$, ($\eta^6$-xylene)($\eta^5$-cyclopentadienyl)$Fe^{+1}$ $SbF_6^-$, and ($\eta^6$-mesitylene)($\eta^5$-cyclopentadienyl)$Fe^{+1}$ $SbF_6^-$.

Useful commercially available initiators include FX-512™ (Minnesota Mining and Manufacturing Company, St. Paul, Minn., CD-1012™, and CD-1010™ (Sartomer,Exton, Pa.) aromatic sulfonium complex salts, UVI™-6974, an aromatic sulfonium complex salt (Union Carbide Corp., Danbury, Conn.) and IRGACURE™ 261, a cationic organometallic complex salt (Ciba Geigy Chemicals, Hawthorne, N.Y.).

Preferably, the photocatalyst is present in the compositions of the invention at levels from about 0.01 to about 10 weight percent, more preferably from about 0.1 to about 5 weight percent, still more preferably from about 0.5 to about 2 weight percent, based on the total weight of the resin (epoxy and EVA) present in the composition.

Where the catalytic photoinitiator used for curing the epoxy resin is a metallocene salt catalyst, it optionally is accompanied by an accelerator such as an oxalate ester of a tertiary alcohol as described in U.S. Pat. No. 5,436,063, although this is optional. Oxalate co-catalysts that can be used include those described in U.S. Pat. No. 5,252,694. The accelerator comprises from about 0.01 to about 5 weight percent, preferably from about 0.1 to about 4 weight percent of the adhesive composition based on the combined weight of the epoxy resin and the thermoplastic ethylene-vinyl acetate copolymer.

Ethylene Vinyl Acetate Copolymer

The thermoplastic component of the invention includes and preferably, consists essentially of one or more thermoplastic ethylene-vinyl acetate copolymer resins. Useful ethylene-vinyl acetate copolymers of the present invention are thermoplastic and contain at least 28 percent by weight vinyl acetate, preferably at least 40 percent by weight vinyl acetate, more preferably at least 50 percent by weight vinyl acetate, and even more preferably at least 60 percent by weight vinyl acetate by weight of the copolymer. Useful ranges of vinyl acetate weight percents include from 28 to 99, generally from 40 to 90, preferably from 50 to 90, and more preferably from 60 to 80 weight percent vinyl acetate in the copolymer. The useful ethylene-vinyl acetate copolymers may contain up to 99 percent by weight vinyl acetate.

Non-limiting examples of commercially available ethylene-vinyl acetate copolymers that may used in practice of the present invention include ELVAX™ 210, 250, 260, and 265 (E.I. Du Pont de Nemours and Co., Wilmington, Del.), and AT Plastics 2820M EVA copolymer (AT Plastics, Inc., Brampton, Ontario, Canada) (28 weight percent vinyl acetate); ELVAX™ 150 and AT Plastics 3325M EVA copolymer (33 weight percent vinyl acetate); ELVAX™ 40W and LEVAPREN™ 400 (Bayer Corp., Pittsburgh, Pa.), AT Plastics 4030M (40 weight percent vinyl acetate); LEVAPREN™ 450, 452, and 456 (45 weight percent vinyl acetate; LEVAPREN™500HV (50 weight percent vinyl acetate), LEVAPREN™ 600 HV (60 weight percent vinyl acetate); LEVAPREN™ 700 HV (70 weight percent vinyl acetate); LEVAPREN™ KA 8479 (80 weight percent vinyl acetate), and the like.

The components used to form the adhesive compositions of the invention are compatible in the molten state. "Compatible" means that the molten mixture of at least the epoxy and thermoplastic components is single phased, that is, does not visibly phase separate among the individual components and forms a homogeneous molten and resulting solid mixture. Of course, one skilled in the art can easily vary the concentrations of the epoxy resins, EVA copolymers and vinyl acetate content therein, and catalysts to form compositions of the invention without undue experimentation. For example, one skilled in the art would generally increase the vinyl acetate concentration of the EVA copolymer as the concentration epoxy containing material in the composition increases so to maintain a singled phased composition in the molten state.

The specific physical properties of the cured adhesive may also be tailored to suit the specific application by adjusting the ratio of the preceding components. Generally, increased tack and adhesion to high energy surfaces, and a decreased tendency to flow during cure is achieved by increasing the relative amount of EVA copolymer in the formulation. Additionally, tack of the composition may be affected by the amount of plasticization of the EVA copolymer by a liquid epoxy resin. The amount of photocatalyst is selected to optimize cure speed and uniformity of through cure. Thus, the relative amounts of the above-mentioned ingredients are balanced depending on the properties sought in the final composition.

Hydroxyl Containing Material

Optionally, the adhesive compositions of the invention may further comprise a hydroxyl-containing material. The hydroxyl-containing material may be any liquid or solid organic material having hydroxyl functionality of at least 1, preferably at least 2. The hydroxyl-containing organic material should be free of other "active hydrogen" containing groups such as amino and mercapto moieties. The hydroxyl-containing organic material should also preferably be devoid of groups which may be thermally or photochemically unstable so that the material will not decompose or liberate volatile components at temperatures below about 100° C. or when exposed to the energy source during curing. Preferably the organic material contains two or more primary or secondary aliphatic hydroxyl groups (that is, the hydroxyl group is bonded directly to a non-aromatic carbon atom). The hydroxyl group may be terminally situated, or may be pendant from a polymer or copolymer. The number average equivalent weight of the hydroxyl-containing material is preferably about 31 to 2250, more preferably about 80 to 1000, and most preferably about 80 to 350. More preferably, polyoxyalkylene glycols and triols are used as the hydroxyl-containing material. Even more preferably, cyclohexane dimethanol is used as the hydroxyl-containing material.

Representative examples of suitable organic materials having a hydroxyl functionality of 1 include alkanols, monoalkyl ethers of polyoxyalkylene glycols, and monoalkyl ethers of alkylene glycols.

Representative examples of useful monomeric polyhydroxy organic materials include alkylene glycols (for example, 1,2-ethanediol, 1,3-propanediol, 1,4-butanediol, 2-ethyl-1,6-hexanediol, 1,4-cyclohexane dimethanol, 1,18-dihydroxyoctadecane, and 3-chloro-1,2-propanediol), polyhydroxyalkanes (for example, glycerine, trimethylolpropane, pentaerythritol, and sorbitol) and other polyhydroxy compounds such as N,N-bis(hydroxyethyl) benzamide, butane-1,4-diol, castor oil, and the like.

Representative examples of useful polymeric hydroxyl-containing materials include polyoxyalkylene polyols (for example, polyoxyethylene and polyoxypropylene glycols and triols of equivalent weight of 31 to 2250 for the diols or 80 to 350 for triols), polytetra-methylene oxide glycols of varying molecular weight, hydroxyl-terminated polyesters, and hydroxyl-terminated polylactones.

Useful commercially available hydroxyl-containing materials include those described in U.S. Pat. No. 5,436,063, incorporated herein by reference.

The amount of hydroxyl-containing organic material used in the compositions of the invention may vary over a broad range, depending on factors such as the compatibility of the hydroxyl-containing material with both the epoxy resin and the ethylene-vinyl acetate copolymer component, the equivalent weight and functionality of the hydroxyl-containing material, and the physical properties desired in the final cured adhesive composition. Typically, the amount of hydroxyl containing material in compositions of the invention range from 0 to about 25 percent by weight of the epoxy containing material in the composition.

The optional hydroxyl-containing material is particularly useful in tailoring the glass transition temperature and flexibility of the compositions of the invention. As the equivalent weight of the hydroxyl-containing material increases, the flexibility of the hot melt make coat correspondingly increases although there may be a consequent loss in cohesive strength. Similarly, decreasing equivalent weight may result in a loss of flexibility with a consequent increase in cohesive strength. Thus, the equivalent weight of the hydroxyl-containing material is selected so as to balance these two properties.

As explained more fully hereinbelow, the incorporation of hydroxyl containing materials, specifically polyether polyols, into the compositions of the invention is especially desirable for adjusting the rate at which the adhesive compositions cure upon exposure to energy. Useful polyether polyols (that is, polyoxyalkylene polyols) for adjusting the rate of cure include polyoxyethylene and polyoxypropylene glycols and triols having an equivalent weight of about 31 to 2250 for the diols and about 80 to 350 for the triols, as well as polytetramethylene oxide glycols of varying molecular weight and polyoxyalkylated bisphenol A's.

The relative amount of the optional hydroxyl-containing organic material is determined with reference to the ratio of the number of hydroxyl groups to the number of epoxy groups in the composition. That ratio may range from 0:1 to 1:1, more preferably from about 0.4:1 to 0.8:1. Larger amounts of the hydroxyl-containing material increase the flexibility of the composition but with a consequent loss of cohesive strength. If the hydroxyl containing material is a polyether polyol, increasing amounts will further slow the curing process.

Additives

Optionally, the adhesive compositions of the invention further comprise up to about 50 percent, preferably, up to 30 percent, by total volume of various additives such as fillers, stabilizers, plasticizers, tackifiers, flow control agents, cure rate retarders, adhesion promoters (for example, silanes and titanates), adjuvants, additives, and the like, such as silica, glass, clay, talc, pigments, colorants, glass beads or bubbles, glass or ceramic fibers, antioxidants, and the like, so as to reduce the weight or cost of the composition, adjust viscosity, and provide additional reinforcement or modify the thermal conductivity of the adhesives compositions and articles of the invention so that a more rapid or uniform cure may be achieved.

Adhesive compositions of the invention may be made electrically conductive, or their resistivity can be lowered to a desired level by the inclusion of electrically conductive filler agents. Such materials include metals, metal-alloys, graphite, etc. in forms such as particles, spheres, flakes, fibers, whiskers, wovens, or non-wovens. Polymeric, ceramic, glass, or other non-conductive materials in the above forms that have an electrically-conductive coating or layer, or that are doped with salts or electrolytes may also be useful fillers for this purpose. Intrinsically conductive organic polymers or other materials may also be used. The choice of filler type, shape, volume percentage loading, etc. can be made according to known methods in order to render the adhesive film isotropically conductive or anistropically (z-axis) conductive depending on the intended application.

Some of the materials above also exhibit useful thermal conductivity and can be used in appropriate quantities to render films of the invention thermally conductive. Or, where it is desired that the film be thermally conductive but electrically insulating, useful fillers include ceramics such as aluminum oxide, glass, boron nitride, zinc oxide, and non-ceramics such as diamond. These materials may be used in the some of the same forms as those listed above for electrically conductive materials.

The various additives are not included in the foregoing weight percent calculations for the adhesive composition.

Method of Making

The adhesive compositions of the invention can be prepared by using either a batch or a continuous process as long as the components are compatible in the melt phase, that is, no visible phase separation among the components.

In a batch process, the adhesive compositions of the invention are prepared by mixing the various ingredients in a suitable vessel, preferably one that is not transparent to actinic radiation, at an elevated temperature sufficient to liquefy the components so that they can be efficiently mixed with stirring until the components are thoroughly melt blended but without thermally degrading or causing premature curing of the materials. The components may be added simultaneously or sequentially, although it is preferred to first blend (in order) the ethylene-vinyl acetate copolymer and epoxy-containing material and followed by the addition of the photocatalyst for the epoxy containing material.

In a continuous process, the adhesive compositions of the invention are mixed in an extruder as above, for example a twin screw extruder, equipped with a down stream port, a static mixer, and an appropriate output orifice (film die, sheet die, profile die, etc.) and a take-up roll and wind up roll(s), as appropriate. Take-up line speed is adjusted as appropriate for the output form.

Compositions may be used directly after melt blending (in a molten form) or may be packaged as a solvent free system in pails, drums, cartridges or other suitable containers, preferably in the absence of light, until ready for use. The compositions so packaged may be delivered to a hot-melt applicator system with the use of pail unloaders, cartridge dispensers, and the like. Alternatively, the adhesive compositions of the invention may be delivered to conventional bulk hot melt applicator and dispenser systems in the form of sticks, pellets, slugs, blocks, pillows or billets for use in continuous processes.

It is also possible to provide the adhesive compositions of the invention as uncured, unsupported adhesive films. Such films are useful in laminating operations and are preferably not tacky.

If the adhesive composition is tacky, it may be provided as a tape, wherein the adhesive composition is provided in film or layer form and rolled up into a roll with a release liner (for example, silicone-coated Kraft paper), with subsequent packaging in a bag or other container that is not transparent to actinic radiation.

Use

The molten adhesive compositions of the invention may be applied to a wide variety of substrates by extruding, spraying, gravure printing, or coating, (for example, by using a coating die, a heated knife blade coater, a roll coater or a reverse roll coater). Alternatively, the adhesive composition may be applied to a substrate in the form of an uncured adhesive film which, if necessary, can be die cut to a predefined shape. Once applied, the adhesive film composition may be tacky or tack-free, a blend of liquid and solid epoxy-containing materials being useful in achieving the former state.

Substrates which can be coated or bonded using compositions of the invention include plastics, metals, ceramics, glass and cellulosic materials although primed, bare, or painted metal substrates such as aluminum, cold rolled steel and porcelainized steel are particularly preferred.

Curing of the adhesive composition begins upon exposure of the composition to any source emitting actinic radiation (that is, radiation having a wavelength in the ultraviolet or visible spectral regions) and continues for a period of time thereafter. Suitable sources of radiation include mercury, xenon, carbon arc, tungsten filament lamps, sunlight, etc. Ultraviolet radiation, especially from a medium pressure mercury arc lamp, is most preferred. Exposure times may be from less than about 1 second to 10 minutes or more (to provide a total energy exposure of about 800 milliJoules/square centimeter (mJ/cm$^2$)) for onium salt catalysts depending upon both the amount and the type of reactants involved, the radiation source, the distance from the radiation source, and the thickness of the composition to be cured. The rate of curing tends to increase with increasing amounts of photoinitiator at a given light exposure or irradiation. The rate of curing also increases with increased radiation intensity.

Those adhesive compositions that include a polyether polyol that retards the curing rate, are particularly desirable when bonding together two substrates that are not transparent to the radiation. After applying the adhesive composition to the first substrate and irradiating the composition, the second substrate may be bonded to the first substrate for a certain period of time (for example, from about 2 minutes to about 4 hours) until the composition has sufficiently cured that a useful bond can no longer be made. Thus, it will be recognized that the presence of the polyether polyol provides the adhesive compositions with an open time. That is, for a period of time (the open time) after the composition has been irradiated, it remains sufficiently uncured for a second substrate to be bonded thereto. The adhesive compositions of the invention which do not include a polyether polyol may be applied to a single substrate and irradiated to provide an adhesive coating on the substrate.

The second substrate is typically bonded using heat, pressure or both heat and pressure, (for example, with a heated press, heated nip rollers, or a heated laminator). Depending on the particular adhesive composition, the conditions for applying the second substrate may range from a few seconds at 177° C. to about 15 seconds at room temperature. Typical exposures are for about 10 seconds at 138° C. Laminator pressures of about 274 kiloPascals (kPa) are useful. In another approach, for example, when cationic organometallic catalysts are used, a free standing film may be irradiated on one or both sides and then placed between two substrates followed by the use of heat, pressure or both heat and pressure to bond the film to the two substrates.

Alternatively, two substrates may be bonded together if one of the substrates is transparent to the radiation, thereby permitting the adhesive composition to be irradiated through the transparent substrate.

Once the adhesive composition is exposed to radiation, the curing process is initiated. Subsequent to radiation exposure the adhesive compositions can be tack-free, or can be tacky for a limited period of time but eventually achieving a tack-free condition. Full cure may be achieved under ambient conditions in about 24 hours or as little as about 8 to 16 hours, depending upon the intensity of the radiation source, the radiation exposure time, the concentration of the photoinitiator, and the particular ingredients which comprise the adhesive composition.

The time to reach full cure may be accelerated by post curing the compositions with heat, such as in an oven. The time and temperature of the post cure will vary depending upon the concentration and type of the photoinitiator, the radiation exposure conditions, and the like. Typical post cure conditions for onium salt type catalysts range from 5 to 15 minutes at about 50° C. to about 1 to 2 minutes at temperatures up to about 100° C. A typical post cure condition for cationic organometallic catalysts is from about 15–35 minutes at a temperature of about 177° C. An accelerated cure can also be achieved by applying heat and pressure to bond two substrates together such as when using a heated press, a heated laminator or heated nip rollers.

Articles

Adhesive articles according to the invention may be readily prepared in many ways. For example, the ingredients for the adhesive composition may be melted and stirred in a suitable mixing vessel (for example, a batch mixer, an extruder, etc.) at an elevated temperature low enough to avoid decomposing any photocatalyst present in the adhesive composition. After mixing, the adhesive composition may be formed into its final shape by a variety of different methods. For example, the adhesive composition can be coated onto a release liner to form a tape using a heated knife coater. Alternatively, the adhesive composition ingredients may be compounded in an extruder and then extruded through a die having a desired profile to produce a shaped strip of adhesive; that is, a strip having the desired cross-sectional shape.

In another approach, the composition can be extruded as a mass and delivered between a pair of motor-driven chilled rolls spaced apart a predetermined distance to form a flat sheet of the adhesive composition that may be subsequently calendared to the desired thickness.

A structure can be imparted to a major surface of the adhesive layer by extruding the adhesive sheet between a pair of nip rolls, at least one of which is embossed with the desired pattern. A sheet of the adhesive composition can also be embossed at any subsequent time by heating the sheet (if necessary) and pressing the sheet with an embossing roll (which may be heated or unheated) carrying the desired pattern.

In one preferred method of manufacture, an actinic radiation blocking release liner is laminated to a film of the uncured adhesive composition to protect the exposed surfaces of the uncured adhesive film from premature exposure to actinic radiation and then converted into the desired final form, (that is, tape, or protected film). This can be accomplished by, for example, slitting it to the desired width, and winding it up into roll form and around a suitable plastic or paper core if needed. Alternatively, the tape or protected film can be slit or otherwise cut into discrete lengths or die cut into desired shapes. Of course, an article can also be prepared by laminating or attaching any type of backing, for example, cloth, polymer, nonwoven, etc., to the adhesive film of the invention.

It is also necessary to protect the composition from premature activation, for example, during storage and shipping. When in the form of protected films, unsupported films, or tapes, this may be accomplished, for example, by storing the entire tape-bearing construction in a radiation-blocking container. The invention will now be described further by way of the following non-limiting examples.

EXAMPLES

Unless otherwise specified the materials used in these examples may be obtained from standard commercial sources such as Aldrich Chemical Co. of Milwaukee, Wis. All amounts used in the examples are in parts by weight unless otherwise specified.

$Ar_3S^+SbF_6^-$ photocurative was prepared as described in U.S. Pat. No. 4,173,476 (col. 5, line 43 to col. 6 line 32), incorporated herein by reference.

AT 4030 thermoplastic ethylene-vinyl acetate copolymer resin (55 melt index, 40 percent vinyl acetate) was obtained from AT Plastics, Inc. (Brampton, Ontario, Canada).

The Brabender mixer was obtained from C. W. Brabender Instruments, Inc. (South Hackensack, N.J.).

Cp(Xylenes)Fe$^+$SbF$_6^-$ photocurative also described as: (eta$^6$-xylenes)(eta$^5$-cyclopentadienyl)iron (1+) hexafluoroantimonate or CpXylFe$^+$SbF$_6^-$ (Cp=cyclopentadiene) was prepared as disclosed in U.S. Pat. No. 5,089,536 (Palazzotto), incorporated herein by reference.

Overlap shear adhesion values were measured using a SINTECH™ 10 tensile test system available from MTS Systems Corp. (Research Triangle Park, N.C.).

Super diazo TLD 15W/03 bulbs are available from Philips N.V., The Netherlands.

E-coated steel panels (ED 5100, ED 5000) were obtained from Advanced Coating Technologies, Inc. (Hillsdale, Mich.).

ELVAX™ 500W (2500 melt index, 14 percent vinyl acetate) and ELVAX™ 40W (56 melt index, 40 percent vinyl acetate) thermoplastic ethylene-vinyl acetate copolymer resins were obtained from E.I. Du Pont de Nemours & Co. (Wilmington, Del.).

EPON™ 1001 F epoxy resin of Bisphenol A (solid at RT), EPON™ 828 epoxy resin of Bisphenol A, and EPONEX™ 1510 hydrogenated Bisphenol A-epichlorohydrin based epoxy resin were obtained from Shell Chemical Co. (Houston, Tex.).

Dicyandiamide (AMICURE™ CG-1200) and CUREZOL™ 2MZ-Azine 2,4-diamino-6(2' methylimidazoleyl-(1'))ethyl-s-triazine (thermal curing agents) were obtained from Air Products and Chemicals, Inc. (Allentown, Pa.).

DYNAPOL™ S1402 (high molecular weight thermoplastic polyester with low crystallinity) was obtained from Creanova, Inc. (Somerset, N.J.).

The Fusion Systems LC-6 Benchtop Conveyor and F300 Lamp System were obtained from Fusion Systems Corp. (Rockville, Md.).

LEVAPREN™ 600HV (Mooney viscosity [ASTM D 1646]=27, 60 percent vinyl acetate), LEVAPREN™ 700HV (Mooney viscosity [ASTM D 1646]=27, 70 percent vinyl acetate), LEVAPREN™ 500HV (Mooney viscosity [ASTM D 1646]=27, 50 percent vinyl acetate), and LEVAPREN™ 400HV (Mooney viscosity [ASTM D 1646]=20, 40 percent vinyl acetate) thermoplastic ethylene-vinyl acetate copolymer resins were obtained from Bayer Corp. (Pittsburgh, Pa.).

UNILIN™ 425 wax was obtained from Petrolite Corp. (St. Louis, Mo.).

FPL etched metal coupons were freshly prepared according to the etching process described in H. W. Eichner, Forest Products Laboratory; Report No. 1842, Apr. 1, 1954, Madison, Wis.

Specifically, the specimens were treated as follows: Each specimen was degreased by soaking for 10 minutes in 75 g of OAKITE 164 (alkaline detergent, Oakite Products Inc. of Berkely Heights, N.J.) per liter of distilled water. Each specimen was then rinsed for 2 minutes in tap water, followed by immersion for 10 minutes at 66–71° C. in an etching bath consisting of 1161 g of $H_2SO_4$, 156.8 g of $Na_2Cr_2O_7 \cdot 2H_2O$, 1.5 g of 2024-T3 bare aluminum alloy chips, and enough distilled water to make 3.5 liters of solution. Following immersion in the etching solution, each specimen is rinsed for 2 minutes with tap water, air dried for 10 minutes, and dried for 10 minutes at 71° C.

General Procedure A For The Preparation Of Adhesives

All ingredients other than catalysts were placed in a container and heated in a convection oven to a temperature sufficient to allow mixing by hand. Typically this was at 149° C. for about 60 minutes. After removal from the oven, the samples were mixed by hand using a tongue depressor. The material was allowed to cool for at least 1 hour before proceeding to the next step.

The cooled material was reheated in a convection oven at 121° C. for 90 minutes. The sample was then removed from the oven and the catalysts to be used were added and mixed into the material by hand. The composition was reheated if needed to facilitate mixing of the catalysts. After mixing, the material was coated immediately onto silicone coated release liner or the desired substrate to the desired thickness using a knife coater with an appropriate coating gap setting.

General Procedure B For The Preparation Of Adhesives

Adhesive compositions were prepared in batch mode using a heated, internally-stirred BRABENDER mixer equipped with roller blades operated at approximately 50 rpm. EVA copolymer was added to the mixer with stirring and heating to 90° C. until homogeneous. The temperature of the mixture was observed to increase to approximately 95° C. due to stirring friction. The epoxy resin was then added slowly and stirring was continued for 1 minute. Then remaining ingredients were added such that any catalysts were added last and stirring was continued until dispersed (ambient light was minimized when photocatalysts were added). The mixture was removed from the reactor and pressed twice at between 121–177° C. in a heated laboratory press, between silicone coated release liners to obtain a free-standing film of desired thickness.

Curing of the Adhesive Compositions

Curing of the adhesive compositions of the invention was accomplished as follows:

$CpXylFe^+SbF_6^-$ containing adhesive compositions were exposed to irradiation using super diazo lamps (TLD 15W/03 lamps, available from Phillips N.V., Holland) at approximately 2.2 J/cm$^2$ for, for example, 2–10 minutes depending on the thickness of the film, typically 10 minutes per side for 40 mil thickness film at a distance of approximately 10 cm. Over exposure to the lights was not detrimental to the performance of the adhesive.

$Ar_3S^+SbF_6^-$ containing adhesive compositions were exposed, bonded, and cured in the following manner. Samples were pressed into films between silicone coated polyester release liners and cut to the appropriate size, usually 1.27 cm×2.54 cm, and the release liner was removed from one side. The sample was attached to an aluminum plate using a loop of tape sticking to the remaining release liner to prevent the sample from moving as it passed under the lamp. The sample was exposed using a FUSION SYSTEMS™ LC-6 Benchtop Conveyor with a F300 Lamp System with 118 W/cm of lamp power using an "H" Bulb. The conveyor was set at 22 fpm (6.7 m/min), and the dosage was 825 mJ/cm$^2$.

Regardless of the exposure method used, the sample was then attached to a 2.54 cm×10.2 cm FPL etched aluminum coupon, the remaining release liner was removed, and the sample was exposed again on this side under the same conditions. Another etched coupon was attached completing the Overlap Shear Test bond specimen. The samples were then postbaked at 177° C. for 30 minutes to ensure complete cure.

Test Methods

45° Flow Test

An E-coated panel was cleaned by spraying it with acetone and wiping it dry, allowing sufficient time to ensure complete drying. The sample to be measured (typically 14.5 mm by 25.4 mm) was lightly adhered to an E-coated panel so that the narrow edge of the sample was pointing down the panel. The panel was then placed in an oven at a 45° incline for 12 minutes at 177° C. unless otherwise specified. The sample was then removed from the oven and allowed to cool to room temperature. Flow was measured as the distance (in mm) the sample flowed relative to its initial position.

Overlap Shear Test

An adhesive composition was laminated between FPL etched 2024 T3 aluminum coupons both 25.4 mm by 76.2 as follows: a 12.7 mm by 25.4 mm sample of adhesive was attached flush to the narrow edge of both coupons so that the overall construction was about 63.5 mm in length. The laminate was clamped together with spring-steel binder clips (0.95 cm capacity clips, ACCO USA, Inc. of Wheeling, Ill.) heated in an oven at 177° C. for 20 minutes, unless otherwise specified.

Overlap shear was measured using a SINTECH™ Model 10 tensile tester equipped with a 22.2 kN load cell at a crosshead speed of 2.54 mm/min. The maximum force before breakage of the sample and the failure mode (for example, cohesive, adhesive, mixed) were noted.

Example 1

These examples demonstrate the advantage of using a photocatalyst to cure epoxy-EVA adhesive compositions according to the present invention. The examples were prepared according to General Procedure B.

TABLE 1

| Ingredients | Comparative Example 1 | Comparative Example 2 | Example 1 | Comparative Example 3 |
|---|---|---|---|---|
| DYNAPOL ™ S1402r | 25 | 25 | 0 | 0 |
| LEVAPREN ™ 700HV | 0 | 0 | 25 | 25 |
| EPON ™ 828 | 25 | 25 | 25 | 25 |
| $CpXylFe^+SbF_6^-$ | 0.5 | 0 | 0.5 | 0 |
| Dicyandiamide | 0 | 1.75 | 0 | 1.75 |
| CURAZOL ™ 2-MZ | 0 | 0.75 | 0 | 0.75 |
| 45° Flow Test (mm) | 7 | 248 | 0 | 1 |
| Overlap Shear Strength (MPa) | 22.4+/−3.7 | 16.7 +/−0.5 | 24.1+/−1.5 | 5.2 +/−0.2 |

In the case of epoxy-polyester adhesive compositions, only a minor difference in overlap shear performance was observed on substitution of a photocatalyst for the thermal catalyst. The effect was much larger (approximately 500 percent improvement) in the case of epoxy-EVA adhesive compositions. Further, the overall performance of the epoxy-EVA adhesive compositions changed from lower to higher adhesion values.

Examples 2–7

These examples demonstrate the effect of the EVA/epoxy resin weight ratios on the performance properties of adhesive compositions according to the present invention. The examples were prepared according to General Procedure A, except for Example 3, which was prepared using General Procedure B. Example 3 was pressed into a film between silicone coated polyester liners and Examples 2, 4–7 were coated onto a silicone coated release liner using a hot knife coater. The samples were cured as described above under the heading "Curing of the Adhesive Compositions."

Examples 2 and 4–7 illustrate the effect of increasing the ratio of EVA to epoxy. Example 3 illustrates the use of a blend of EVA resins in combination with epoxy resin and a photocatalyst.

TABLE 2

| Ingredients | Example 2 | Example 3 |
|---|---|---|
| LEVAPREN ™ 700HV (70% vinyl acetate) | 20.0 | 44.5 |
| LBVAPREN ™ 600HV (60% vinyl acetate) | 0 | 0 |
| AT 4030 (40% vinyl acetate) | 0 | |
| EPON ™ 828 | 79.5 | 44.5 |
| CpXylFe$^+$SbF$_6^-$ | 0.5 | 1.0 |
| Overlap Shear Strength (MPa) | 18.6 | 25.3 |

| Ingredients | Example 4 | Example 5 | Example 6 | Example 7 |
|---|---|---|---|---|
| LEVAPREN ™ 700HV (70% vinyl acetate) | 30 | 40 | 50 | 59.5 |
| LEVAPREN ™ 600HV (60% vinyl acetate) | 0 | 0 | 0 | 0 |
| AT 4030 (40% vinyl acetate) | 0 | 0 | 0 | 0 |
| EPON ™ 828 epoxy resin | 69.5 | 59.5 | 49.5 | 40 |
| CPXylFe$^+$SbF$_6^-$ | 0.5 | 0.5 | 0.5 | 0.5 |
| Overlap Shear Strength (MPa) | 26.7 | 28.4 | 26.2 | 9.3 |

Examples 8–10

These examples demonstrate the effect of vinyl acetate content of the EVA copolymer on the compatibility between the EVA copolymer and a preferred epoxy resin. The data show that as the vinyl acetate content of the EVA copolymer decreases, the incompatibility of the adhesive mixture increases, as demonstrated by lower overlap shear adhesion values. Examples 8 and 9 were prepared according to General Procedure A; Example 10 and Comparative Example 4 were prepared according to General Procedure B so as to facilitate mixing.

TABLE 3

| Ingredients | Example 8 | Example 9 | Example 10 | Comparative Example 4 |
|---|---|---|---|---|
| LEVAPREN ™ 700HV (70% vinyl acetate) | 49.5 | 0 | 0 | 0 |
| LEVAPREN ™ 600HV (60% vinyl acetate) | 0 | 49.5 | 0 | 0 |
| LEVAPREN ™ 500HV (50% vinyl acetate) | 0 | 0 | 49.5 | 0 |
| LEVAPREN ™ 400HV (40% vinyl acetate) | 0 | 0 | 0 | 49.5 |
| EPON ™ 828 | 49.5 | 49.5 | 49.5 | 49.5 |
| CpXylFe$^+$SbF$_6^-$ | 1.0 | 1.0 | 1.0 | 1.0 |
| Overlap Shear Strength (MPa) | 26.2 | 16.7 | 14.6 | Incompatible mixture, could not be mixed |

Examples 11–13

These examples demonstrate the effect of blends of epoxy and EVA on compositional compatibility according to the present invention. Examples 11 and 12 show the effect of blending relatively high and low vinyl acetate-containing EVA copolymers with aromatic and aliphatic epoxy resins. Example 13 is an adhesive made using a relatively low vinyl acetate containing EVA copolymer with a blend of aromatic and aliphatic epoxy resins. The above examples were prepared according to General Procedure A.

TABLE 4

| Ingredients | Example 11 | Example 12 | Example 13 |
|---|---|---|---|
| LEVAPREN ™ 700HV | 25 | 39.5 | 0 |
| AT 4030 | 24.5 | 20 | 49 |
| EPON ™ 828 | 25 | 39.5 | 20 |
| EPONEX ™ 1510 | 24.5 | 0 | 30 |
| CpXylFe$^+$SbF$_6^-$ | 1 | 1 | 1 |
| Overlap Shear Strength (MPa) | 12.9 | 17.6 | 8.8 |

Examples 14–17

Examples 14–17 further show the variety of components that may be used in the adhesive compositions of the invention and their effect on the bond strength of the resulting adhesive. Example 14 contains relatively high vinyl acetate-containing EVA copolymer with an aromatic epoxy and a sulfonium catalyst. Examples 15–17 contain epoxy resin that is a solid at room temperature. The examples were prepared according to General Procedure B.

TABLE 5

| Ingredients | Example 14 | Example 15 | Example 16 | Example 17 |
|---|---|---|---|---|
| LEVAPREN ™ 700HV | 49.5 | 49 | 49 | 39 |
| EPON ™ 828 | 49.5 | 40 | 30 | 40 |
| EPON ™ 1001 | 0 | 10 | 20 | 20 |

TABLE 5-continued

| Ingredients | Example 14 | Example 15 | Example | Example 17 |
|---|---|---|---|---|
| CpXylFe$^+$SbF$_6^-$ | 0 | 1 | 1 | |
| Ar$_3$S$^+$SbF$_6^-$ | 1 | 0 | 0 | 0 |
| Overlap Shear Strength (MPa) | 12.5 | 22.3 | 23.3 | 22.7 |

Examples 18 and 19

These examples illustrate the effect of the vinyl acetate content of an EVA copolymer on the bond strength of an adhesive comprising an aliphatic epoxy resin and an EVA copolymer. The examples were prepared according to General Procedure A.

TABLE 6

| Ingredients | Example 18 | Example 19 |
|---|---|---|
| ELVAX ™ 40W (40% vinyl acetate) | 50 | 0 |
| LEVAPREN ™ 700HV (70% vinyl acetate) | 0 | 50 |
| EPONEX ™ 1510 | 50 | 50 |
| CpXylFe$^+$SbF$_6^-$ | 1 | 1 |
| Overlap Shear Strength (MPa) | 7.0 | 13.2 |

Example 20

This example demonstrates an adhesive composition of the present invention that is suitable for hem flange bonding. The resulting adhesive had good tack, repositionability, and adhesive performance. The example was prepared according to General Procedure B.

TABLE 7

| Ingredient | Parts by Weight |
|---|---|
| LEVAPREN ™ 700HV | 42 |
| EPON ™ 828 | 31.5 |
| EPON ™ 1001 | 10.5 |
| Aluminum oxide | 15 |
| CpXylFe$^+$SbF$_6^-$ | 1 |

Example 21

This example illustrates the use of adhesives according to the present invention to bond a metal to metal hem flange. An adhesive composition was prepared according to General Procedure B using the following amounts of ingredients: LEVAPREN™ 700HV (44.5 parts), EPON™ 828 epoxy resin (44.5 parts), aluminum oxide (10.0 parts), CpXylFe$^+$SbF$_6^-$(1.0 part).

Two pieces of 30.5 cm×10.1 cm cold rolled steel were bent to angles appropriate for making a hem flange bond. For the piece that makes the inner part of the hem, 1.9 cm was bent up to an angle of about 45 degrees. For the outer part of the hem, 1.3 cm was bent up past perpendicular to an angle of about 120 degrees. Both bends were made to run the long way on the panel. Strips of the bulk adhesive were cut and pressed between silicone coated polyester release liner to about 0.38 mm. Strips of tape (2.54 cm width) were cut from this for bonding. The tape was exposed through the liner for three minutes on each side using two 40 Watt 1.2 meter Super Diazo Blue Fluorescent lights (Philips TL 40W/03) at a distance of about 10 cm.

The panels were prepared by wiping the bond area with Minnesota Mining and Manufacturing Company General Purpose Adhesive Cleaner No.-08984. The tape was then wrapped around the inner part of the hem so that the tape would bond to both the show-side of the outer panel and under the hem. The tape showed the right amount of tack and conformability to hold itself to the metal and wrap easily around the edge. The inner panel was inserted into the hem, which was pounded down tight against the inner panel, completing the hem flange. The tape was cured using a heat gun, heating both sides of the bond along the entire length of the bond for a total of about 15 minutes. The entire assembly was allowed to cool. Upon cooling, the adhesive squeeze out was inspected for indications of the extent of cure. The adhesive had hardened so that a thumb nail could not penetrate it. This indicated that an adequate cure had been achieved.

Example 22

The adhesive composition of Example 20 was prepared according to General Procedure B for the preparation of adhesives. After removal of the composition from the BRABENDER mixer, the material was stretched out into a rope and allowed to cool to room temperature. Care was taken to avoid deleterious exposure of the material to ambient light, thereby preventing premature curing of the adhesive. A single screw extruder with a 2.54 cm width adjustable ribbon die set at about 0.38 mm gap was attached to the BRABENDER mixer. The rope of material was fed into the extruder, and the extrudate was wound around a core using a double sided release liner. The tape was allowed to cool to room temperature and was then ready for use.

Other embodiments are within the following claims. While the invention has been described with reference to the particular embodiments and drawings set forth above, the spirit of the invention is not so limited and is defined by the appended claims.

What is claimed is:

1. A method comprising the steps of:
   a) providing an homogeneous molten mixture comprising a curable epoxy resin, an ethylene-vinyl acetate thermoplastic resin, and an effective amount of a photocatalyst for the curable epoxy resin, wherein the composition is free from hydrocarbon polyolefins and solvent;
   b) applying the mixture to a substrate or processing the mixture into an unsupported film; and
   c) at any subsequent time, activating the photocatalyst to cure the epoxy containing material.

2. The method according to claim 1 wherein said method is a batch process.

3. The method according to claim 1 wherein said method is a continuous process.

* * * * *